United States Patent [19]

Lin

[11] Patent Number: 4,898,495

[45] Date of Patent: Feb. 6, 1990

[54] METHOD AND APPARATUS TO CONTROL A BEACH AT AN INLET AND TO MAINTAIN THE BEACH

[76] Inventor: Newman K. Lin, 22648 SW. 54th Ave., Boca Raton, Fla. 33433

[21] Appl. No.: 272,392

[22] Filed: Nov. 17, 1988

[51] Int. Cl.$^4$ ............................................. E02B 3/02
[52] U.S. Cl. ..................................... 405/73; 405/15; 405/21; 405/52; 405/74
[58] Field of Search ....................... 405/15, 21, 22, 28, 405/29, 34, 35, 43, 45, 52, 73, 80, 84

[56] References Cited

U.S. PATENT DOCUMENTS

| | | | |
|---|---|---|---|
| 510,713 | 12/1893 | Scott | 405/73 X |
| 4,614,458 | 9/1986 | Austin | 405/52 X |
| 4,645,377 | 2/1987 | Vesterby | 405/15 X |
| 4,669,914 | 6/1987 | Kortmann | 405/52 |

Primary Examiner—Randolph A. Reese
Assistant Examiner—Arlen L. Olsen
Attorney, Agent, or Firm—Malloy & Malloy

[57] ABSTRACT

A method of beach/inlet stabilization, based upon a beach/inlet stabilization system for bypassing the littoral drift to cross an inlet, is provided. The beach/inlet stabilization system consists of a well system, a diffuser system, a flow guiding system, a sediment trapping system, a dune drainage system and a water surface elevation sensor. The method disclosed includes the steps of: (1) trapping the sediment carried by the littoral drift during flood tides and storms, with the sediment trapping system in the inlet during flood tides and storms, (2) regenerating the littoral drift by flushing the sediment trapping system when the ebb tidal current is weak, (3) directing the regenerated littoral drift by the diffuser system, located around the jetties between the inlet and the downstream beach, toward the downstream beach suffering from erosion or starvation of the littoral drift, (4) guiding the regenerated littoral drift toward the shore of the downstream beach, (5) lowering the ground water table of the downstream beach by the well system, (6) draining the excess ground water of the dune as the result of storm surges, adjacent to the downstream beach, and (7) sensing the water surface elevation and water flow velocity by the water surface elevation sensor, to generate control signals for the operation of the well system, the diffuser system, the sediment trapping system, the flow guiding system, and the drainage system.

66 Claims, 8 Drawing Sheets

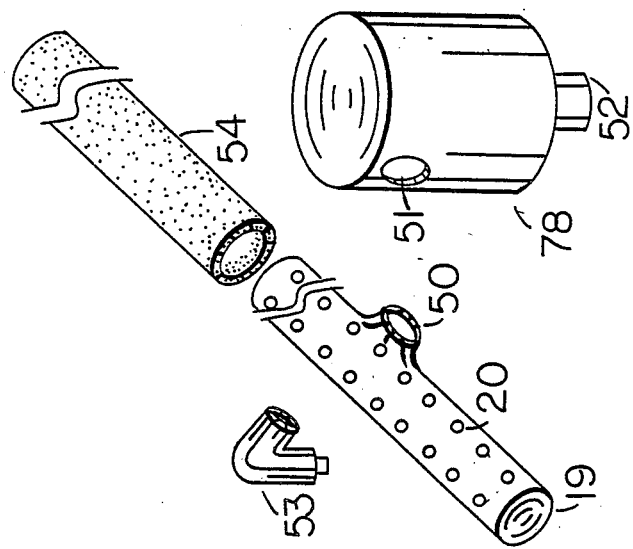
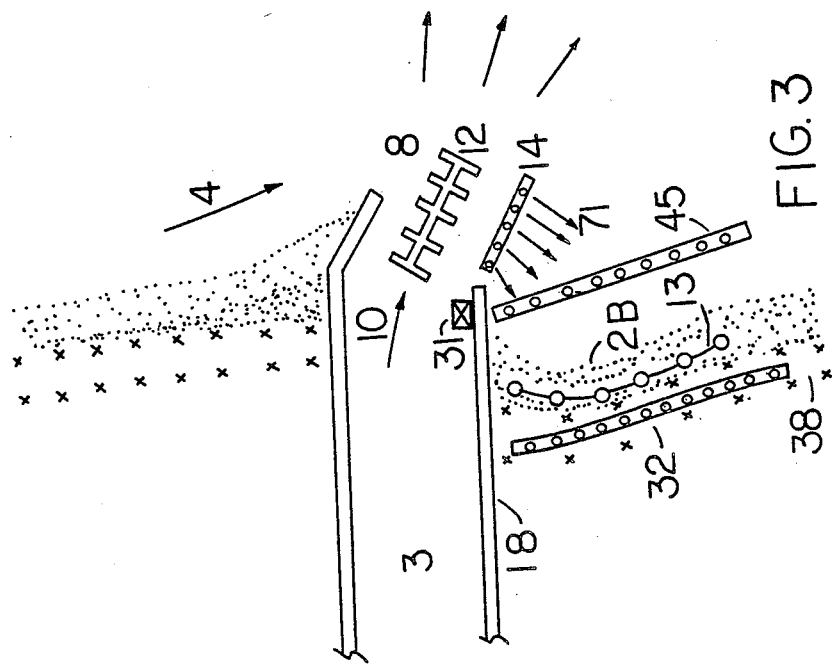

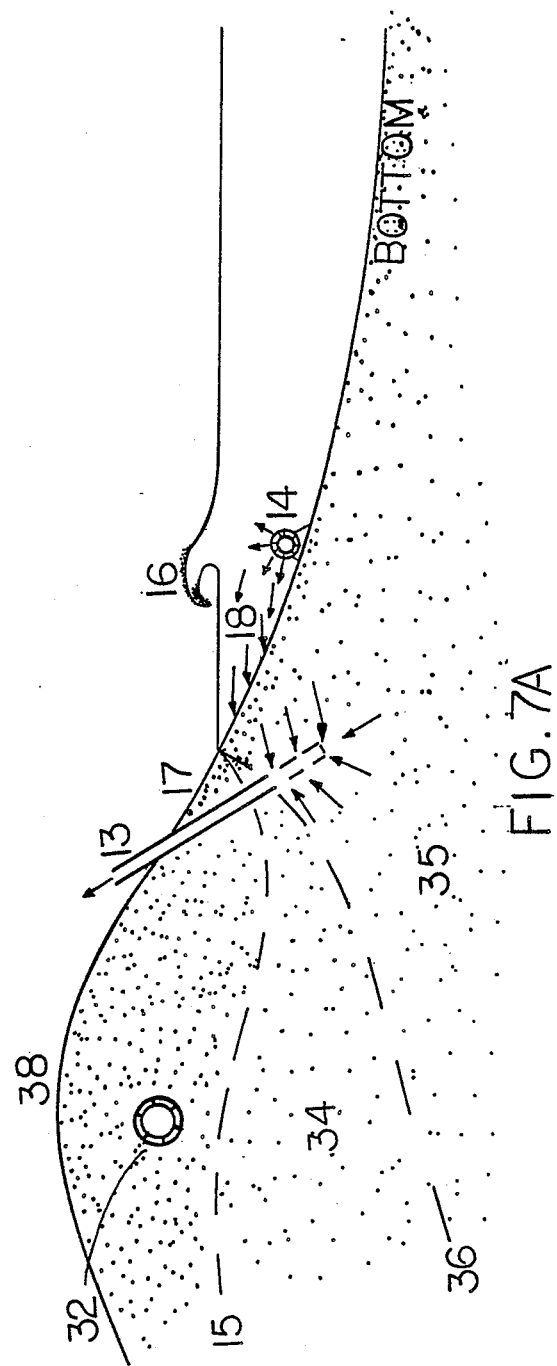

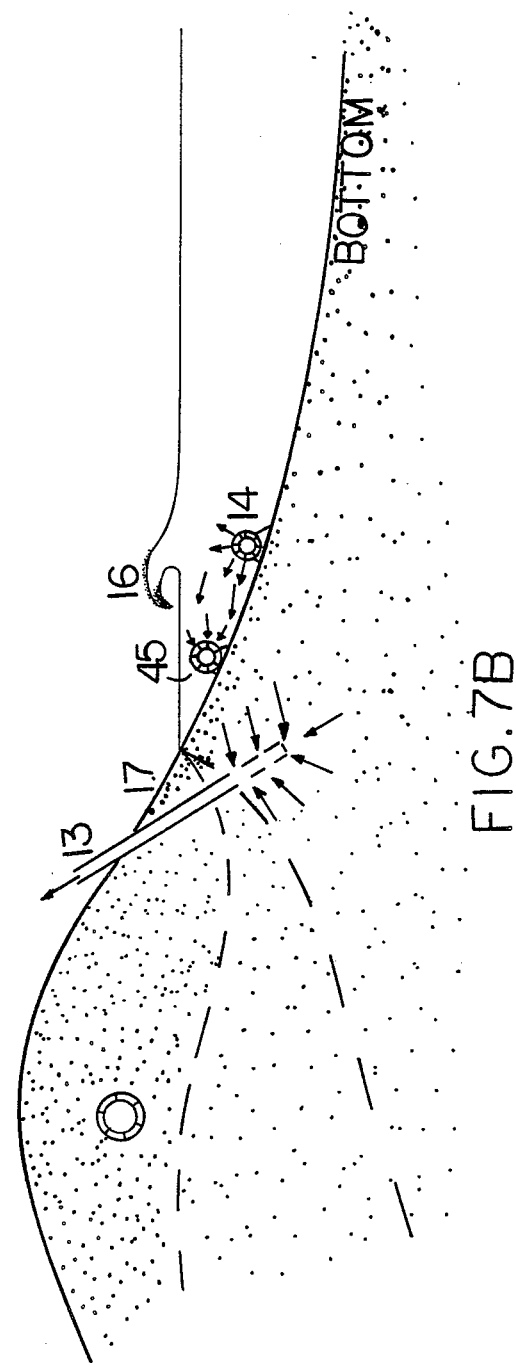

METHOD AND APPARATUS TO CONTROL A BEACH AT AN INLET AND TO MAINTAIN THE BEACH

SUMMARY OF THE INVENTION

This invention relates to an apparatus and method to control and maintain a beach at an inlet, where there is a dune dividing the beach and the mainland, generally described as a beach/inlet stabilization system, wherein the apparatus includes a well system, diffuser system, a flow guiding system, a sediment trapping system, a dune drainage system, and water surface elevation sensor, and the method includes the steps of: (1) trapping the sediment carried by the littoral drift, during flood tides and storms, with the sediment trapping system in the inlet, (2) regenerating the littoral drift by flushing the sediment trapping system when the ebb tidal curr is weak, (3) directing the regenerated littoral drift, by the diffuser system located around the jetties between the inlet entrance and the downstream beach, toward the downstream beach suffering from erosion or starvation of the littoral drift, (4) guiding the regenerated littoral drift toward the shore the downstream beach, (5) lowering the ground water table of the downstream beach by the well system, (6) draining the excess ground water of the dune as the result of storm surges, adjacent to the downstream beach, (7) sensing the water surface elevation and water flow velocity by the water surface elevation sensor, to generate control signals for the operation of the well system, the diffuser system, the sediment trapping system, the flow guiding system, and the drainage system.

This invention provides a method and apparatus to control and maintain a beach at an inlet. During flood tides or storm surges, water is vacuumed out of the sediment trapping system, inducing a downward velocity to trap the sediment carried by the littoral drift, before the sediment is drifted into the inlet. The water drawn from the sediment trapping system, discharges into the diffuser system to generate a water flow toward the downstream beach, in stopping the sediment transport from the downstream beach to the inlet. The well system, or flow guiding system are used to intensify the flow by pressuring water into the diffuser system.

When the ebb tidal current is weak, the well system supplies water for the sediment trapping system, to flush the trapped sediment, and for the diffuser system, to direct the re-suspended material toward the downstream beach. The flow guiding system will suck the re-suspended material over the downstream beach, to heal the eroded section of the beach. Thus, a littoral drift is re-generated at the inlet entrance, and continued in the downstream beach. This also resolves the sedimentation problem of the navigation channel in the inlet. The water delivery is driven by pumps, and controlled by a water surface elevation sensor.

Lowering the ground water table by the well system, also allows the coastal water to seep through the beach media into the nearshore aquifer, weakens the wave run-up and offshore sediment transport on the downstream beach during rough seas, and accelerates the suspended materials to deposit. The dune drainage system is activated to mitigate the dune erosion when a high water level is detected. This also reduces dune media drifting into the inlet. The trapped sediment should be flushed toward the downstream beach in a weak ebb tide after the storm surge recess.

It is, therefore, an object of this invention to solve the sediment bypassing problem for stabilizing a tidal inlet. Another objective of the invention is to stabilize the downstream beach of the tidal inlet. The invention, accordingly, comprises the features of construction, combination of elements and method of operations.

BACKGROUND OF THE INVENTION

Water waves breaking on a beach, not only suspend beach materials, but also produce a longshore current. The longshore current carrying the suspended beach material is called the littoral drift. Noticeably, a longshore current can also be generated by winds or other natural forces. Traditionally, referring to the predominant littoral drift direction, coastal engineers and scientists term the beach benefiting from accretion, as the upstream beach of the inlet, and the beach suffering from erosion, as the downstream beach.

In the past, beach erosion in the downstream beach of an inlet has been considered by those in the coastal engineering field to be a problem without a solution. Also within the inlet area, sedimentation in the navigation channel also accompanies beach erosion in the downstream beach, compounding the problem. The beach/inlet problems result from: (1) the inlet interrupts of the littoral drift, and traps the sediment in the navigational channel of the inlet during flood tides and storms, so that the downstream beach starves for the sediment, and (2) diffraction of the obliquely incident waves by the jetties of the inlet, and refraction by the nearshore topography, cause the uneven wave set-up on the downstream beach, inducing a nearshore circulation cell carrying beach materials to form offshore bars, and/or to shoal the navigation channel of the inlet. Here, the wave set-up is interpreted as the mean water surface displacement, produced by the wave excess momentum (called the radiation stress) of the breaking waves inside the surf zone. The mean water displacement increases linearly with water depth as the shore is approached. This water surface slope provides a hydrostatic pressure gradient for the driving force of the nearshore circulation cell. The reference regarding this phenomenon is explained in the paper "A Numerical Model of Nearshore Currents Based on a Finite Amplitude Wave Theory" by M. Yamaguchi in the Proceedings of the 21st International Conference on Coastal Engineering, Chapter 64, Pages 849–863, 1984.

Since the problems aforesaid of coastal hydrodynamics of the beach/inlet system is coupled, both problems, (a) the problem of beach erosion, and (b) the problem of inlet sedimentation, must be solved simultaneously. This invention provides a method and device for bypassing the littoral drift and for stabilizing the downstream beach.

DESCRIPTION OF PRIOR ART

Although there are several erosion control devices that have been patented, they are not suitable for the inlet/beach system.

For example, U.S. Pat. No. 4,502,816 issued to Creter on Mar. 5, 1985, describes a Shoreline Breakwater as a prismatic shaped concrete structure which is used in shorelines to break waves. However, this prior art Shoreline Breakwater, if used at an inlet, will trap the littoral drift, resulting in robbing sediment from the neighboring beaches. In particular, when the sand source is interrupted by the inlet, the structure will make erosion even worse. Also, the structure becomes a navigation hazard. If used at an inlet, almost all prior art coastal structures share the same disadvantages as described above, and hence, such structures are not suitable for the inlet/beach problem. An important feature of this invention is to solve the problems created by prior art coastal structures at an inlet area.

U.S. Pat. No. 4,645,377 issued to Vesterby on Feb. 24, 1987, describes a "Method of Causing Sedimentation of Sedimentary Solid Material Transported in a Body of Water such as a Lake, a Sea, or an Ocean." The method utilizes drainage pipes to unsaturate the beach face, to produce seepage through the beach face, so that sediment will be accreted on the beach face. This method causes the beach to advance offshore until a new equilibrium profile is established. However, when the littoral drift is interrupted by an inlet, the method will steal sediment from the far downstream beach and thus causes more erosion there. This method becomes useless in the inlet area without bypassing the littoral drift across the inlet. According to the method, gravity drainage pipes are laid below the mean low-water level, but it is very difficult for them to reach the interface between the underground fresh and salt waters. The drain will be located in the upper fresh water zone. Hence, lowering the ground water table results in rising the interface, causing salt water intrusion and damaging plants in the coastal zone. Indeed, lowering the ground water table of a beach to prevent beach erosion was discovered by U.S. Grant who published a paper entitled "Influence of the Water Table on Beach Aggradation and Degradation" in the Journal of Marine Research, Volume VII, Number 3, Pages 655–660, 1948. He stated "a high water table accelerates beach erosion, and conversely, a low water table results in pronounced aggradation of the foreshore."

The fact that lowering the ground water table of a beach reduces wave action on the beach, was systematically analyzed by Sixiong Chen in his dissertation entitled "Water Wave Behaviour on a Permeable Slope" to meet the requirements of a DOKTOR-INGENIEUR degree from der Technischen Universitat Hamburg-Harburg, West Germany on Apr. 30, 1987. Clearly, lowering the ground water table of a beach becomes essential to prevent beach erosion.

A method using Jet Pumps for bypassing littoral drift was described by James E. Clausner in his paper "Jet Pump Sand Bypassing at the Nerang River Entrance, Queensland, Australia," published in the Florida Shore and Beach Preservation Association Meeting, Gainesville, Fla., Mar. 23–25, 1988.

The jet pumps were designed by Tony Wakefield, a British hydraulic engineer. The jet pumps suck the sediment-water mixture from the upstream beach and discharge to the downstream beach. The problems of the jet pump sand bypassing are: (1) the sediment-water mixture is discharged as a momentum jet into the receiving water so that the sediment cannot settle down on the downstream beach; (2) during the floor tides, the discharged sediment will be carried into the inlet to cause the sedimentation problem. Hence, the method of jet pump sand bypassing cannot provide a full solution for the beach/inlet problem.

OBJECTS OF THIS INVENTION

Thus, the prior art does not teach a method fully capable of bypassing the littoral drift interrupted by the inlet. The method of this invention provides a solution of the beach/inlet problems. It corrects the shortcomings of the existing methods and beach erosion control devices. Instead of interrupting littoral drift, the method of this invention enables littoral drift to bypass inlets. This method first traps the littoral drift at the entrance of an inlet, by the sediment trapping system, during flood tides and storms, and then regenerates a littoral drift by flushing the trapped sediment on the sediment trapping system, when the ebb tidal current is weak. The regenerated littoral drift is directed by a diffuser system and, located at the entrance or around the jetties between the inlet and the downstream beach, and/or a flow guiding system, located at the nearshore of the downstream beach, toward the shore. The regenerated littoral drift is pushed by the diffuser system, and sucked by the flow guiding system, to feed and to heal the downstream beach. A new beach profile will be established eventually and secured by lowering the ground water table of the downstream beach. Clearly, the present method enables the littoral drift to continue in the downstream beach.

Additionally, the method of this invention will also change the circulation on the adjacent beaches of an inlet, and absorb wave action. It uses a well system which lowers the nearshore ground water table, and when the table is lowered, the coastal water seeps into the beach media to absorb more wave energy and to secure the existing beach material on the beach surface. The well system, in conjunction with the diffuser system, not only produces an onshore current seeping into the aquafier under the downstream beach, but also forces the littoral drift to continue at the inlet entrance. The well system used in the present invention penetrates into the nearshore aquifer, that is the underground salt water zone, which is not possible to reach using the gravity drain system disclosed in U.S. Pat. No. 4,645,377.

Discharging the underground salt water onto the land or canal is forbidden by environmental protection agencies. Discharging the salt water into the ocean without a diffuser system will cause local erosion around the outfall outlet, and weaken the outfall foundation. In the present invention, the water is discharged into a diffuser system to drive an onshore circulation cell on the beach, and to interfere with the nearshore water waves. It can prevent the offshore sediment transport in rough seas during storms and ebb tides, end increase wave energy comsumption on the beach. The water is also used to flush a sediment trapping system to regenerate a littoral drift from the inlet entrance.

This invention provides a sediment trapping system, a flow guiding system, a diffuser system and a well system. Without the sediment trapping system, one can only bypass a small part of littoral drift across the inlet during slack tides, but cannot stop sedimentation in the navigation channel of an inlet; without the diffuser system and the flow guiding system, one cannot bypass the littoral drift to cross the inlet; without the well system, one cannot stabilize the downstream beach. Hence, use of the method of the present invention solves (a) beach erosion problems, and (b) also, bypasses the littoral drift across the inlet to prevent the inlet sedimentation problem. A dune drainage system can be incorporated into the beach/inlet stabilization system for mitigating the dune erosion caused by storm surges.

BRIEF DESCRIPTION OF THE DRAWINGS

The invention will now be described on reference to the accompanying drawings in which:

FIG. 3 is a schematic drawing illustrating a beach/inlet stabilization system in accordance with the invention;

FIG. 4 is a partial perspective view of the typical elements of the diffuser, flow guiding, or dune drainage apparatus;

FIG. 7A illustrates an onshore current seeping into the porous beach media, induced by the well and diffuser systems;

FIG. 7B illustrates the use of the combination of a well system with a diffuser system and a flow guiding system for beach erosion control;

DESCRIPTION OF A PREFERRED EMBODIMENT

Figure 1:
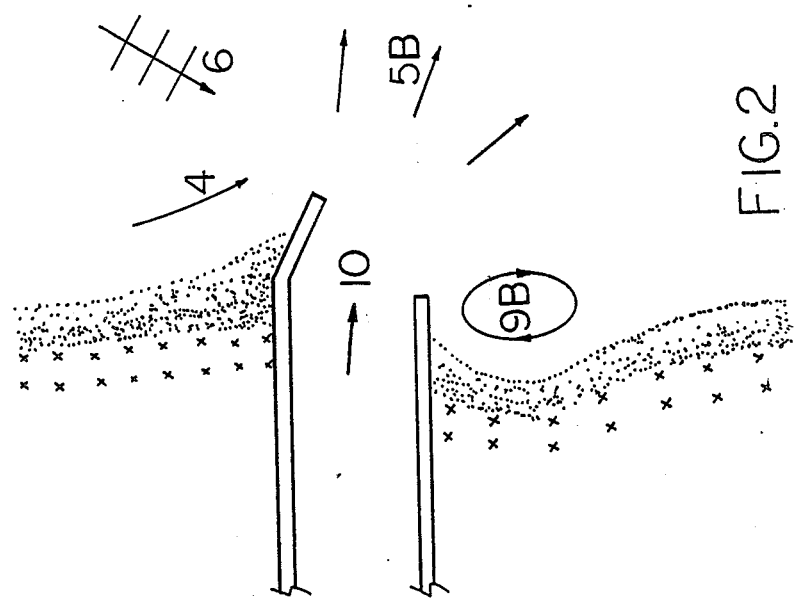
FIG. 1 is a drawing illustrating the typical nearshore circulation around an inlet in a flood tide.

Referring to FIG. 1, the jetties 1A and 1B extend from the inlet 3 to the main water body 40, and interrupts the littoral drift indicated by the arrowed line 4 driven by the incoming wave 6. The littoral drift 4, it is seen, is deflected by the flood tidal current 5A at the inlet entrance 8, forming the channel flow indicated by the arrowed line 7 flowing into the inlet 3. In the nearshore of the downstream beach 2B, the circulation 9A is driven by the uneven wave set-up resulting from the diffraction of the incoming wave 6 by the jetties 1A and 1B. The interference of the littoral drift 4 by the jetties 1A and 1B, and by the inlet 3, causes accretion in the upstream beach 2A, and recession in the downstream beach 2B. In a lot of inlet areas, the dunes 38 and 39 are the most important buffer zone between the main water body 40 and the land 33.

Figure 2:
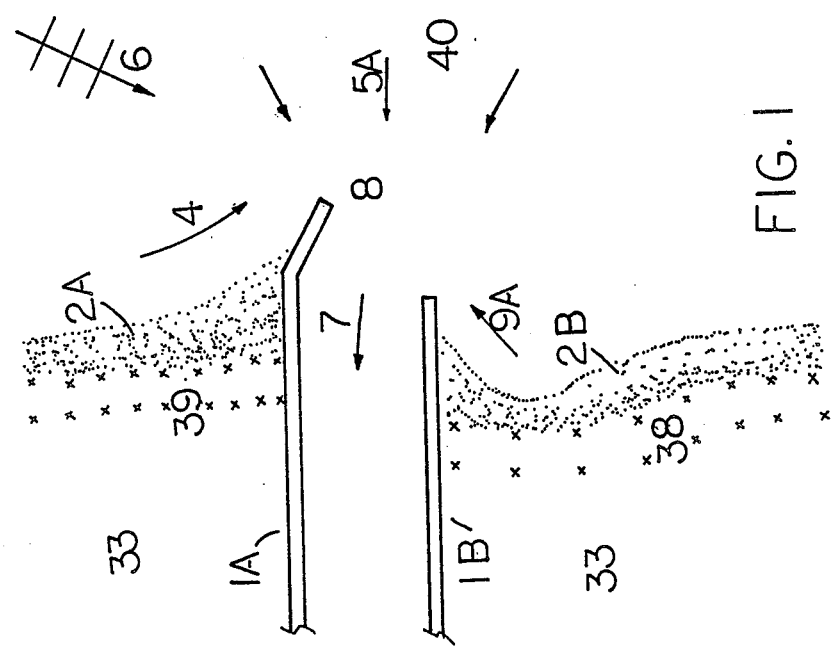
FIG. 2 is a drawing illustrating the typical nearshore circulation around an inlet in an ebb tide.

Referring to FIG. 2, the incoming wave 6 is still driving the circulation 9B intensified by an ebb tidal current 10. The littoral drift 4 is deflected by the ebb tidal current 10 to offshore in the direction of the arrowed lines 5B. Hence, the littoral drift 4 is continuously interrupted by the inlet 3 in ebb tides.

Referring to FIG. 3, the subsystems for a beach/inlet stabilization of this invention is illustrated. It includes a sediment trapping system 12 anchored on the navigation-channel floor of the inlet entrance 8 (a) to trap the sediment carried by the littoral drift 4 during flood tides and storms, and (b) to flush the trapped sediment when the ebb tidal current 10 is weak. The diffuser system 14 is installed around the ocean end of the jetties 1A and 1B to produce water flow in the direction of the arrowed lines 71 toward the downstream beach 2B. The well system 13 on the downstream beach 2B supplies water for the sediment trapping systems 12, to flush and to fluidize the trapped sediment, and for the diffuser system 14 to generate the water flow 71. When the ebb tidal current 10 is weak, the water flow 71 directs the re-suspended sediment, becoming a regenerated littoral drift sucked by the flowing guiding system into the downstream beach. On the other hand, during flood tides, the water flow 71 becomes a hydraulic breakwater to reduce the sediment drifting into the inlet 3. When storm surges raise up the mean water level, the drainage system 32 vacuums the excessive ground water of the dune 38, and discharges it into the diffuser system 14. The operation of the entire system is controlled by a water surface level sensor 31, which is capable of sensing the water surface elevation and its corresponding flow velocity.

FIG. 4 shows the diffuser 19 of the diffuser system 14. It includes a flow guiding system, and drainage system. In a diffuser system, a flow deflector 53 is plugged into the manifold 20; water is pressured into the diffuser 19 through the diffuser port 50 and discharged through the flow deflector 53. In the drainage and flow guiding systems, instead of the flow deflector 53, the filter 54 is used to prevent sediment intruding into the diffuser 19 through the manifold 20. Water forced through the filter 54, is collected by the sump 78 from the diffuser 19 through the intake 50 and the sump port 51, and vacuumed out through the sump outlet 52.

Figure 5:
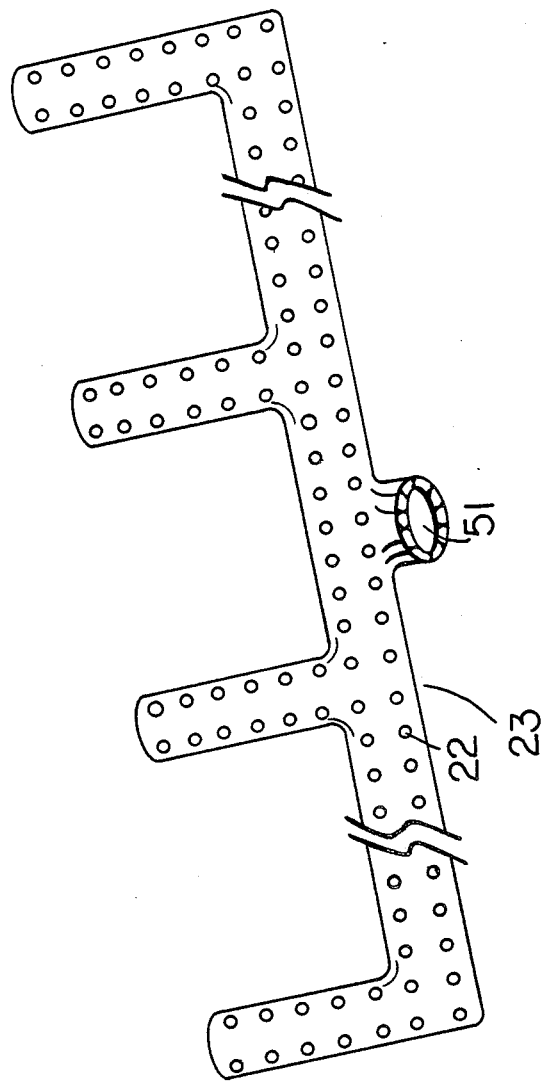
FIG. 5 is a perspective view of the typical element of sediment trapping system.

A typical element of a sediment trapping system as shown in FIG. 5 is the assembled diffuser frame 23 with the manifold 22 and port 51. In sediment trapping cycles, water is vacuumed out of the assembled diffuser frame 23 through the port 51, to induce an inflow through the manifold 22. In flushing cycles, water is pressurized into the assembled diffuser frame 23, and discharged through the manifold 22 to fluidize and to flush the trapped sediment.

Figure 6:
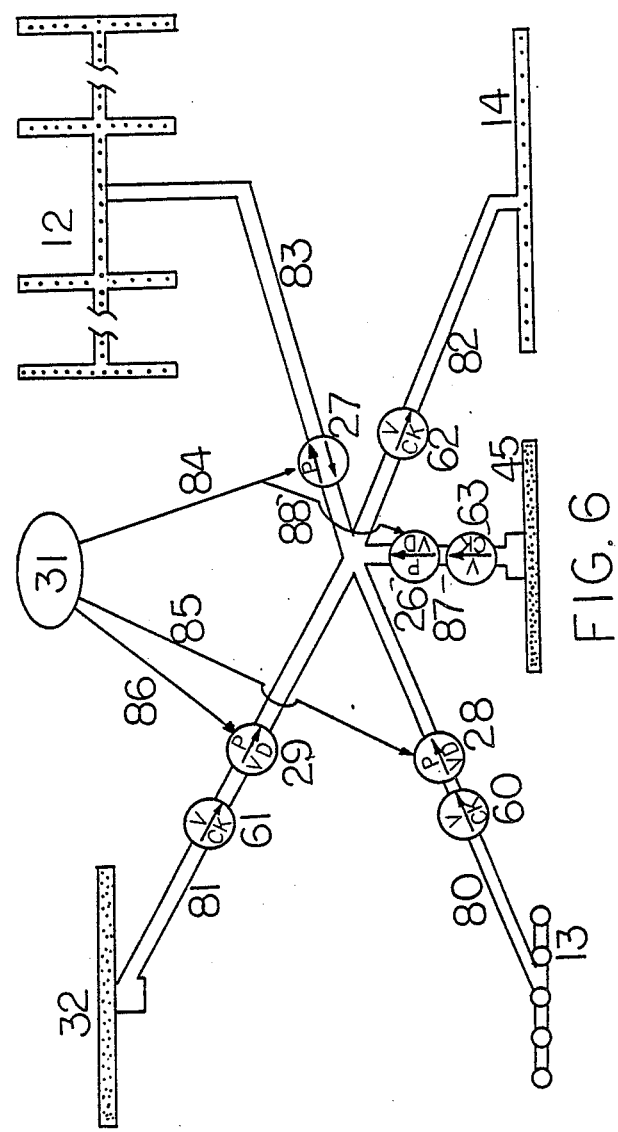
FIG. 6 is a hydraulic circuit diagram of the beach inlet stabilization system including the sediment trapping system.

With reference to FIG. 6 for a typical hydraulic circuit diagram of the beach/inlet stabilization system, the water surface level sensor 31 controls the following devices: (1) the reversible pump 27, by the control cable 84, driving the flushing/trapping operation of the sediment trapping system 12; (2) the well pump 28, by the control cable 85, for supplying the pressured water flow from the well system 13 to the diffuser system 14 and/or the sediment trapping system 12; (3) the drainage pump 29, by the control cable 86, for vacuuming the drainage system 32, when a high water level is detected; (4) the flow guiding pump 26, by the control cables 84 and 88, when the sediment trapping system performs flushing. The hydraulic circuit also includes the check valves 60, 61, 62, 63 in the well pipeline 80, the drainage pipeline 81, the diffuser pipeline 82, and the flow guiding pipeline 87, respectively. The flow direction in the trapping pipeline 83 is directly controlled by the reversible pump 27. The well pipeline 80, the drainage pipeline 81, the diffuser pipeline 82, the trapping pipeline 83 and the flow guiding pipeline 87 make the well system 13, the drainage system 32, the diffuser system 14, the sediment trapping system 12, and the flow guiding system 45 interconnect together.

FIG. 7A shows the onshore current indicated by the arrowed lines 18 formed by combining operation of the well system 13 with the diffuser system 14. The well system 13 lowers the ground water table 15, and thus reduces the local ground water pressure, to allow water to seep into the porous media of the beach face 17. Seepage on the beach face 17 reduces run-up of the breaking wave 16. The effect of the well system 13 on the local coastal hydrology also includes lowering both the ground water table 15 and the interface 36 between the fresh ground water 34 and the salt ground water 35. The drainage system 32, located above the ground water table 15 in the dune 38 in the normal weather condition, is useful only when the mean water surface rises up to a prescribed level, corresponding to the dune erosion to occur.

The effectiveness of wave energy abortion will be enhanced if the flow guiding system 45 works with the diffuser system 14 and the well system 13, as shown in FIG. 7B. Here, water discharged from the diffuser system is provided by the well system 13 and the flow guiding system 45. In this arrangement, the impact of the breaking wave 16 on the beach face 17 is significantly reduced. Nearshore sand bars will be formed around the flow guiding system. Hence, this example is very useful for beach erosion control during storms.

Figure 7C:
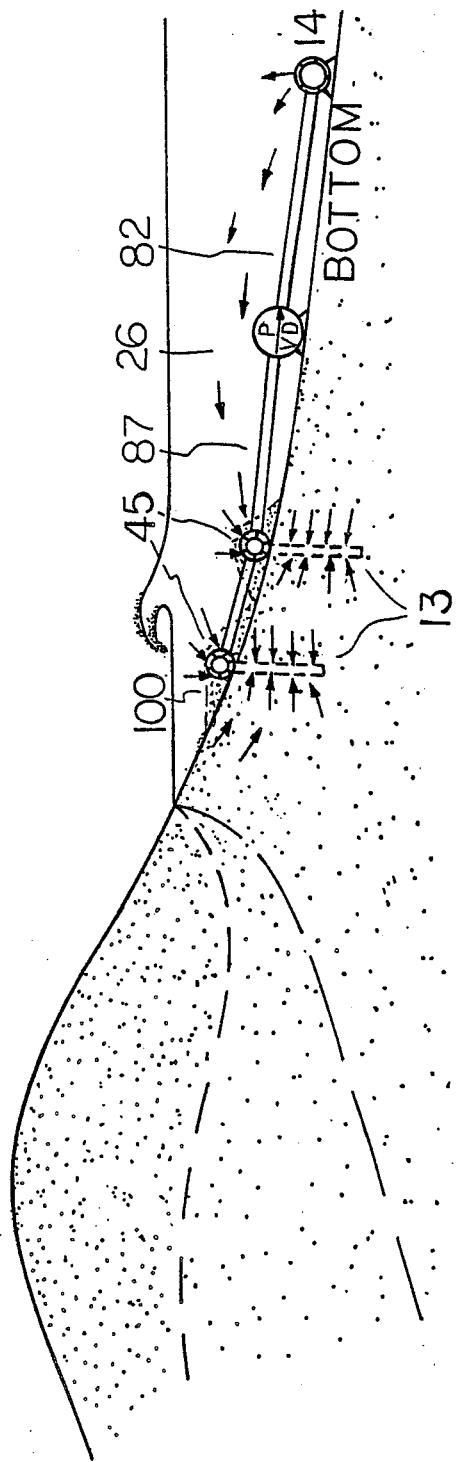
FIG. 7C illustrates the use of the combination of a well system with a diffuser system and a flow guiding system for beach renourishment.

As shown in FIG. 7C, the well system 13 directly connects with the flowing guiding system 45, so that the ground water drawn by the well system 13 can be also discharged through the flow guiding system 45 into the diffuser system 14 offshore. Here, the well system 13 becomes an anchor of the flow guiding system 45. The flow guiding pump 26 is used to pressurize water from the flow guiding pipeline 87 to the diffuser pipeline 82. The continuous operation of this system produces the nearshore sand bar 100 and eventually, offshore sediment will be carried on the shore to renourish the beach during high tides and storm surges.

Figure 8:
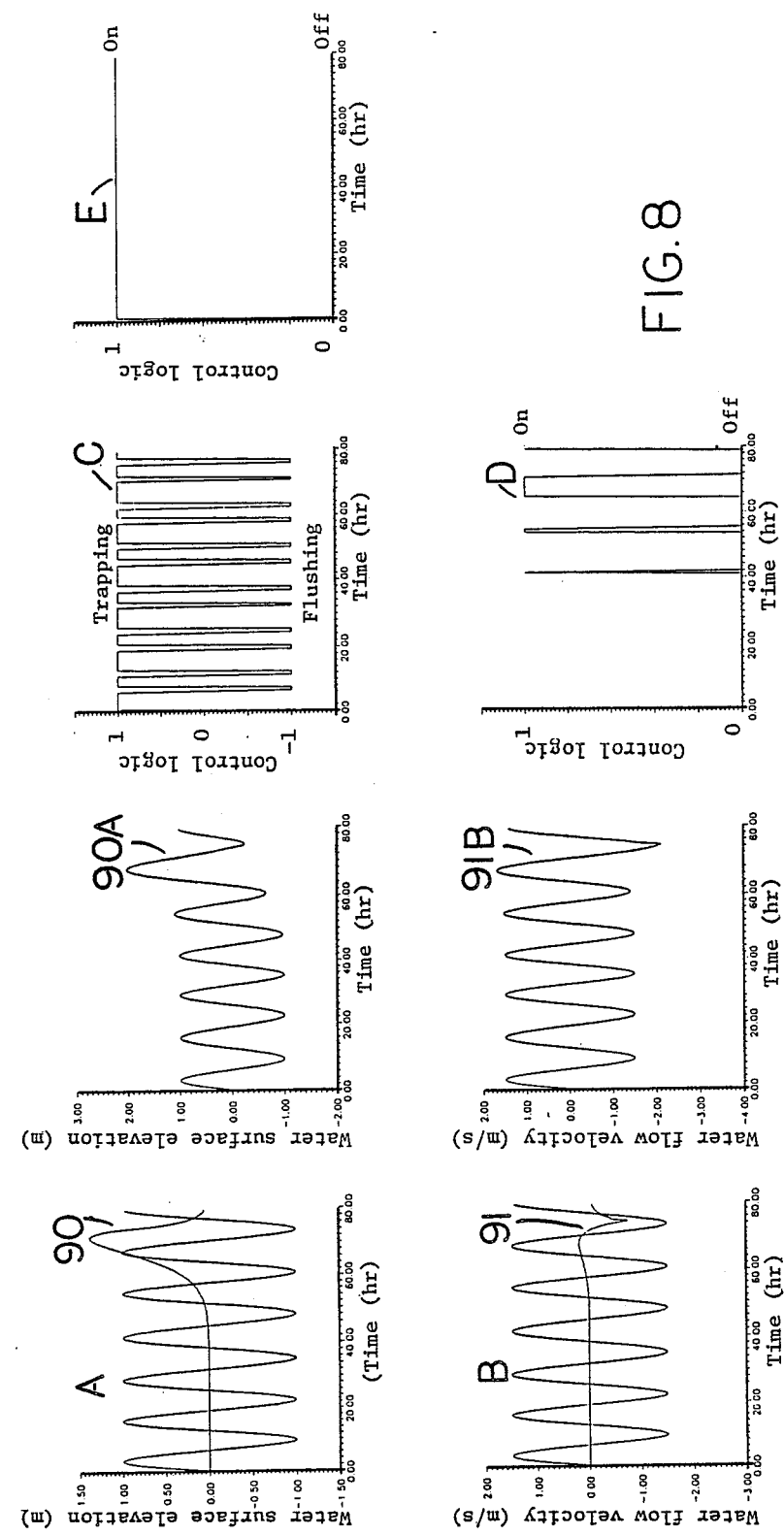
FIG. 8 illustrates control signals generated by a water surface elevation sensor.

Referring to FIG. 8 for the illustration of the system control, a water surface elevation sensor picks up the tidal elevation A, and the tidal current B which is linearly proportional to the tidal elevation A. During storm surges, the surge water elevation 90 and the surge water flow 91 superimpose on the tidal elevation A and the tidal current B respectively. The time histories of the resulting water surface elevation and water flow speed are represented by the composite elevation 90A and the composite current 91B. Accordingly, the trapping/flushing control signal C continuously signals for trapping sediment during flood tides or storm surges, or when ebb tidal currents are strong; otherwise for flushing sediment. The drainage control signal D is set when the composite elevation 90A shows an unusual high water level. The well control signal E is on as long as the trapping/flushing operation is activated. The beach-/inlet stabilization system can be shut off in slack tides if necessary.

While the instant invention has been shown and described in what is considered to be a practical and preferred embodiment, it is recognized that departures may be made within the spirit and scope of this invention which is, therefore, not to be limited except as set forth in the claims hereinafter and within the doctrine of equivalents.

What is claimed is:

1. For beach erosion control and maintenance control at an inlet, a method for bypassing the littoral drift of a body of water from the upstream beach of an inlet having an entrance to the downstream beach of the inlet, wherein the downstream beach is of porous media comprising the steps of:

during flood tides, trapping the sediment carried by a littoral drift, with an inflow into a sediment trapping means anchored on the bottom of a body of water, around the entrance of said inlet, said trapping means comprising at least one assembled diffuser frame, trapping pipeline means and reversible pump means to vacuum water out of said sediment trapping means, said sediment trapping means having an outflow path, re-suspending the trapped sediment of the outflow path discharged of said sediment trapping means into said body of water, to form a regenerated littoral drift, when an ebb tidal current is weak, said outflow path resulting from water flowed into said sediment trapping means by said reversible pump means, and generating a water flow by a diffuser means installed on the floor of the water body between the downstream beach and said inlet, to direct said regenerated littoral drift toward the downstream beach, said diffuser means comprising a diffuser with flow deflector means and pipe means including check valve means on the pipe means, said pipe means interconnecting said diffuser means and said trapping means, and accepting fluid flow from said trapping means.

2. A method according to claim 1 comprising:

lowering the ground water table of the downstream beach by a well system and inducing a seeping flow from said body of water into the porous media of the downstream beach, including selectively drawing ground water of the downstream beach into said diffuser means and sediment trapping means, said well system comprising a well extending into the downstream beach porous media and pump means including pipeline means and check valve means in the pipe means, said pipe means interconnecting said well and said sediment trapping means and said diffuser means.

3. A method according to claim 2 comprising:

draining the excessive ground water adjacent the downstream beach by means of a drainage system during storm surges, said drainage system comprising at least one diffuser and filter means, pump means, and pipeline means including check valve means to prevent a reversible water flow, said pipeline means being effective to discharge water into said trapping means and said diffuser means.

4. A method according to claim 3 further comprising:

guiding said regenerated littoral drift toward the shore of the downstream beach, by at least one flow guiding system which sucks the nearshore water on the downstream beach to supply said diffuser and trapping system for flushing the trapped sediment, said flow guiding system comprising at least one diffuser covered by a filter, connected with at least one flow guiding pump and one check valve for suction operation in at least one flow guiding pipeline.

5. A method according to claim 4 comprising:

sensing the water surface elevation and water flow velocity using water surface elevation sensor means for the generation of control signals to control said pump means.

6. A method according to claim 3 comprising:

sensing the water surface elevation and water flow velocity using water surface elevation sensor means for the generation of control signals to control said pump means.

7. A method according to claim 2 further comprising:

guiding said regenerated littoral drift toward the shore of the downstream beach, by at least one flow guiding system which sucks the nearshore water on the downstream beach to supply said diffuser and trapping system for flushing the trapped sediment, said flow guiding system comprising at least one diffuser covered by a filter, connected with at least one flow guiding pump and one check valve for suction operation in at least one flow guiding pipeline.

8. A method according to claim 7 comprising:
sensing the water surface elevation and water flow velocity using water surface elevation sensor means for the generation of control signals to control said pump means.

9. A method according to claim 2 comprising:
sensing the water surface elevation and water flow velocity using water surface elevation sensor means for the generation of control signals to control said pump means.

10. A method according to claim 1 further comprising:
guiding said regenerated littoral drift toward the shore of the downstream beach, by at least one flow guiding system comprising means to water adjacent the downstream beach to supply said diffuser means and trapping means for flushing trapped sediment, said flow guiding system comprising at least one diffuser filter means and pipe means including flow guiding pump means and check valve means for suction operation.

11. A method according to claim 10 comprising:
sensing the water surface elevation and water flow velocity using water surface elevation sensor means for the generation of control signals to control said pump means.

12. A method according to claim 1 comprising:
sensing the water surface elevation and water flow velocity using water surface elevation sensor means for the generation of control signals to control said pump means.

13. A method for consuming water-wave energy of a body of water having a floor and for preventing beach erosion on a beach during storms comprising:
trapping the sediment carried by a littoral drift in a body of water,
re-suspending the trapped sediment into the body of water to form a regenerated littoral drift,
generating an onshore current to weaken an offshore sediment transport and to consume water-wave energy near the shore by using a diffuser system anchored on the floor adjacent the beach wherein said diffuser system comprises diffuser means with flow deflector means, and said diffuser system includes one diffuser pipe means to accept pressured water flow, and
drawing ground water from a well system on said beach and flowing said ground water to said diffuser system pipe means to lower the ground water table under said beach, said well system comprising at least one well extending into the beach and pump means with a pipe including check valve means interconnecting the well and said diffuser system pipe means.

14. A method according to claim 13 further comprising:
draining ground water adjacent to said beach by means of a drainage system comprising at least one diffuser means including filter means, said drainage system further including pump means and pipeline means including a check valve means and said drainage system being effective to vacuum ground water adjacent the beach and to discharge said ground water into said diffuser system pipe means during storm surges.

15. A method according to claim 14 further comprising:
guiding said onshore current toward the shore by flow guiding system means to suck water from the body of water adjacent said beach to supply said diffuser system, said flow guiding system comprising at least one diffuser including a filter means and pipe means including pump means and check valve means for sucking the water from the body of water and delivering said water to said diffuser system pipe means.

16. A method according to claim 15 further comprising:
sensing the water surface elevation of the body of water by water surface elevation sensor means and to selectively activating said well system pump means, said flow guiding system pump means and said drain system pump means when a storm surge or rough seas are detected in said body of water by said sensor means.

17. A method according to claim 14 further comprising:
sensing the water surface elevation of the body of water by water surface elevation sensor means and selectively activating said well system pump means and said drainage system pump means when a storm surge or rough seas are detected in said body of water by said sensor means.

18. A method according to claim 13 further comprising:
guiding said onshore current toward the shore by flow guiding system means to suck water from the body of water adjacent said beach to supply said diffuser system, said flow guiding system comprising at least one diffuser including a filter means and pipe means including pump means and check valve means for sucking the water from the body of water and delivering said water to said diffuser system pipe means.

19. A method according to claim 18 further comprising:
sensing the water surface elevation of the body of water by water surface elevation sensor means and selectively activating said well system pump means and said flow guiding system pump means when a storm surge or rough seas are detected in said body of water by said sensor means.

20. A method according to claim 13 further comprising:
sensing the water surface elevation of the body of water surface elevation sensor means and activating said well system pump means when a storm surge or rough seas are detected in said body of water by said sensor means.

21. For use in controlling beach erosion and maintaining a beach, apparatus for bypassing littoral drift from an upstream beach of an inlet to a downstream beach comprising:
means adjacent an upstream beach for trapping the sediment carried by a littoral drift in a body of water,
means adjacent an upstream beach for re-suspending the trapped sediment in a body of water to form a regenerated littoral drift, and means adjacent an upstream beach for generating a water flow in a body of water to direct said regenerated littoral drift toward the downstream beach.

22. Apparatus according to claim 21 comprising:
means for lowering the ground water table of the downstream beach.

23. Apparatus according to claim 22 comprising:
means for draining the excessive ground water of the downstream beach.

24. Apparatus according to claim 23 further comprising:
means for guiding said regenerated littoral drift toward the downstream beach.

25. Apparatus according to claim 24 comprising:
means for sensing the water surface elevation and water flow of said inlet including means to activate said means for trapping, said means for re-suspending, said means for generating, means for guiding and said means for lowering.

26. Apparatus according to claim 23 comprising:
means for sensing the water surface elevation and water flow of said inlet including means to activate said means for trapping, said means for re-suspending, said means for generating, said means for lowering and said means for draining.

27. Apparatus according to claim 22 further comprising:
means for guiding said regenerated littoral drift toward the downstream beach.

28. Apparatus according to claim 27 comprising:
means for sensing the water surface elevation and water flow of said inlet including means to activate said means for trapping, said means for re-suspending, said means for generating and said means for lowering.

29. Apparatus according to claim 22 comprising:
means for sensing the water surface elevation and water flow of said inlet including means to activate said means for trapping, said means for re-suspending, said means for generating and said means for lowering.

30. Apparatus according to claim 21 comprising:
means for draining the excessive ground water of the downstream beach.

31. Apparatus according to claim 30 further comprising:
means for guiding said regenerated littoral drift toward the downstream beach.

32. Apparatus according to claim 31 comprising:
means for sensing the water surface elevation and water flow of said inlet including means to activate said means for trapping, said means for re-suspending, said means for generating, means for guiding and said means for lowering.

33. Apparatus according to claim 30 comprising:
means for sensing the water surface elevation and water flow of said inlet including means to activate said means for trapping, said means for re-suspending, said means for generating and said means for draining.

34. Apparatus according to claim 21 further comprising:
means for guiding said regenerated littoral drift toward the downstream beach.

35. Apparatus according to claim 34 comprising:
means for sensing the water surface elevation and water flow of said inlet including means to activate said means for trapping, said means for re-suspending, said means for generating and said means for guiding.

36. Apparatus according to claim 21 comprising:
means for sensing the water surface elevation and water flow of said inlet including means to activate said means for trapping, said means for re-suspending and said means for generating.

37. For controlling beach erosion at a beach of porous media and consuming water-wave energy, apparatus at the beach comprising:
means for trapping sediment carried by a littoral drift in a body of water,
means for re-suspending the trapped sediment into the body of water to form a regenerated littoral drift,
means for generating an onshore current to counter offshore sediment transport and to consume water-wave energy near the shore,
means for drawing ground water of said beach to induce a seepage flow through the porous media on said beach more wave attenuation.

38. Apparatus according to claim 37 further comprising:
means for draining the excessive ground water at said beach during storm surges.

39. Apparatus according to claim 38 further comprising:
means for guiding said onshore current to counter offshore sediment transport.

40. Apparatus according to claim 39 further comprising:
means for sensing the water surface elevation to detect storm surges and rough seas, said means for sensing including means to activate said means for lowering, said means for draining and said means for guiding.

41. Apparatus according to claim 38 further comprising:
means for sensing the water surface elevation to detect storm surges and rough seas, said means for sensing including means to activate said means for lowering and said means for draining.

42. Apparatus according to claim 37 further comprising:
means for guiding said onshore current to counter offshore sediment transport.

43. Apparatus according to claim 42 further comprising:
means for sensing the water surface elevation to detect storm surges and rough seas, said means for sensing including means to activate said means for lowering and said means for guiding.

44. Apparatus according to claim 37 further comprising:
means for sensing water surface elevation to detect storm surges and rough seas, said means for sensing including means to activate said means for drawing.

45. A method to restore an eroded beach or to prevent scoring of sea walls during storms comprising:
trapping sediment carried by a littoral drift in a body of water,
re-suspending the trapped sediment into the body of water to form a regenerated littoral drift,
generating an onshore current by a diffuser system anchored on the nearshore floor of the eroded beach, to weaken the offshore sediment transport and to consume water-wave energy near the shore, said diffuser system comprising at least one diffuser with at least one flow deflector, said diffuser system being connected with at least one diffuser pipeline to accept pressured water flows;

guiding said onshore current toward the shore, by at least one flow guiding system which sucks the nearshore water on the eroded beach to supply said diffuser system, said flow guiding system comprising at least one diffuser with a filter, connected with at least one sump, one flow guiding pump, and one check valve for suction operation in at least one flow guiding pipeline.

46. A method according to claim 45 further comprising:

draining the ground water of the dune adjacent to the eroded beach, by a drainage system comprising at least one diffuser having a filter, and at least one sump, said drainage system being driven by at least one pump, connecting with at least a pipeline having a check valve, said drainage system vacuuming the ground water, and discharging into said diffuser system during storm surges.

47. A method according to claim 46 further comprising:

sensing the water surface elevation by at least one water surface elevation sensor to turn on said flow guiding system and/or said drain system when a storm surge or rough seas are detected.

48. A method according to claim 45 further comprising:

sensing the water surface elevation by at least one water surface elevation sensor to turn on said flow guiding system during high tides or storms.

49. Apparatus to restore an eroded beach or to prevent scoring of sea walls comprising:

means for trapping sediment carried by a littoral drift in a body of water, means for re-suspending the trapped sediment into the body of water to form a regenerated littoral drift, means for generating an onshore current to bring sediment from offshore to the shore, means for guiding said onshore current to the shore to heal the eroded beach and to absorb wave impact on the beach.

50. Apparatus according to claim 49 further comprising:

means for sensing the water surface elevation around the eroded beach for operation control.

51. Apparatus according to claim 50 further comprising:

means for sensing the water surface elevation around the eroded beach for operation control.

52. Apparatus according to claim 49 comprising:

means for draining the excessive ground water, as a result of storm surges, in the dune adjacent to the eroded beach.

53. For beach erosion control and inlet maintenance, a method for bypassing the littoral drift of a body of water from the upstream beach of an inlet having an entrance to the downstream beach of the inlet, wherein the downstream beach is of porous media comprising the steps of:

arresting the sediment carried by a littoral drift, with an inflow into a sediment arresting means anchored on the bottom of a body of water, around the entrance of said inlet, said arresting means comprising at least a pair of assembled diffuser frames, trapping pipeline means and pump means to vacuum sediment-water mixture out of said sediment arresting means, wherein at least one of said assembled diffuser frames provides an outflow to fluidize the trapped sediment and to dilute the sediment-water mixture, so that the other ones of said assembled diffuser frames can remove the sediment-water mixture, discharging the arrested littoral drift into the body of water by a diffuser means installed on the floor of the water body between the downstream beach and said inlet, toward the downstream beach, said diffuser means comprising at least one diffuser means with flow deflector means and pipe means including check valve means on the pipe means, said diffuser means interconnecting said trapping means, accepting sediment-water mixture from said trapping means, guiding the arrested littoral drift through the body of water toward the shore of the downstream beach, by at least a flow guiding system comprising means to suck water adjacent the downstream beach to supply said diffuser means and sediment arresting means, said flow guiding system comprising at least one diffuser filter means and pipe means including flow guiding pump means and check valve means for suction operation.

54. A method according to claim 53 comprising:

lowering the ground water table of the downstream beach by a well system, and inducing a seeping flow from said body of water into the porous media of the downstream beach, including selectively drawing ground water of the downstream beach into said diffuser means and sediment arresting means, said well system comprising at least a well extending into the downstream beach porous media in the nearshore water and pump means including pipeline means and check valve means in the pipe means, said pipe means interconnecting said well system, said flow guiding system, said sediment arresting means and said diffuser means.

55. A method according to claim 54 comprising:

draining the excessive ground water of the dune adjacent to the downstream beach by a drainage system during storm surges, said drainage system comprising at least one diffuser and filter, said drainage system being driven by at least one pump in a drainage pipeline with at least one check valve to prevent a reversible water flow, said drainage system discharging water into said sediment arresting means and said diffuser means.

56. A method according to claim 55 comprising:

sensing the water surface elevation and water flow velocity, by at least one water surface elevation sensor, for the generation of control signals.

57. A method according to claim 54 comprising:

sensing the water surface elevation and water flow velocity, by at least one water surface elevation sensor, for the generation of control signals.

58. A method according to claim 53 comprising:

sensing the water surface elevation and water flow velocity, by at least one water surface elevation sensor, for the generation of signals.

59. For use in controlling beach erosion and prevent inlet sedimentation, apparatus for bypassing the littoral drift from an upstream beach of an inlet to a downstream beach comprising:

means for arresting littoral drift around the inlet entrance, means for discharging the arrested littoral, drift to the nearshore water of said downstream beach through the body of water, means for guiding the arrested littoral drift onto the shore of said downstream beach.

60. Apparatus according to claim 59 comprising:

means for lowering the ground water table of said downstream beach.

61. Apparatus according to claim 60 comprising:

means for draining excessive ground water in a dune during storms.

62. Apparatus according to claim 61 comprising:

means for sensing water surface elevation and water flow for system operation control.

63. Apparatus according to claim 60 comprising:

means for sensing water surface elevation and water flow for system operation control.

64. Apparatus according to claim 59 comprising:

means for draining excessive ground water in a dune during storms.

65. Apparatus according to claim 61 comprising:

means for sensing water surface elevation and water flow for system operation control.

66. Apparatus according to claim 59 comprising:

means for sensing water surface elevation and water flow for system operation control.

* * * * *